United States Patent [19]
Jones

[11] 3,965,739
[45] June 29, 1976

[54] FLOW METER

[76] Inventor: Ray L. Jones, 258 Paseo de Granada, Redondo Beach, Calif. 90277

[22] Filed: May 13, 1975

[21] Appl. No.: 577,019

[52] U.S. Cl. .......................................... 73/194 E
[51] Int. Cl.² ...................................... G01F 1/00
[58] Field of Search ............... 73/194 R, 194 E, 3

[56] References Cited
UNITED STATES PATENTS

| | | | |
|---|---|---|---|
| 2,948,144 | 8/1960 | Applequist | 73/3 |
| 3,308,660 | 3/1967 | De Ford | 73/194 E |
| 3,397,570 | 8/1968 | Pfrehm | 73/3 |
| 3,835,695 | 9/1974 | Grove | 73/3 |

*Primary Examiner*—Richard C. Queisser
*Assistant Examiner*—John P. Beauchamp
*Attorney, Agent, or Firm*—Georges A. Maxwell

[57] ABSTRACT

A flow meter means for flowing columns of mixed liquids and gases comprising an elongate flow tube between upstream and downstream sections of a fluid conducting line, an elongate return duct with upstream and downstream ends communicating with the sides of the tube at longitudinally spaced fronts, a plurality of plugs slidably engaged in the tube, and shiftable through the duct, means to intermittently move plugs from the upstream end of the duct into the tube and to move plugs from the tube into the downstream end of the duct and means to count the number of plugs moved into and out of the tube and to time the rate at which the plugs move through the tube.

13 Claims, 6 Drawing Figures

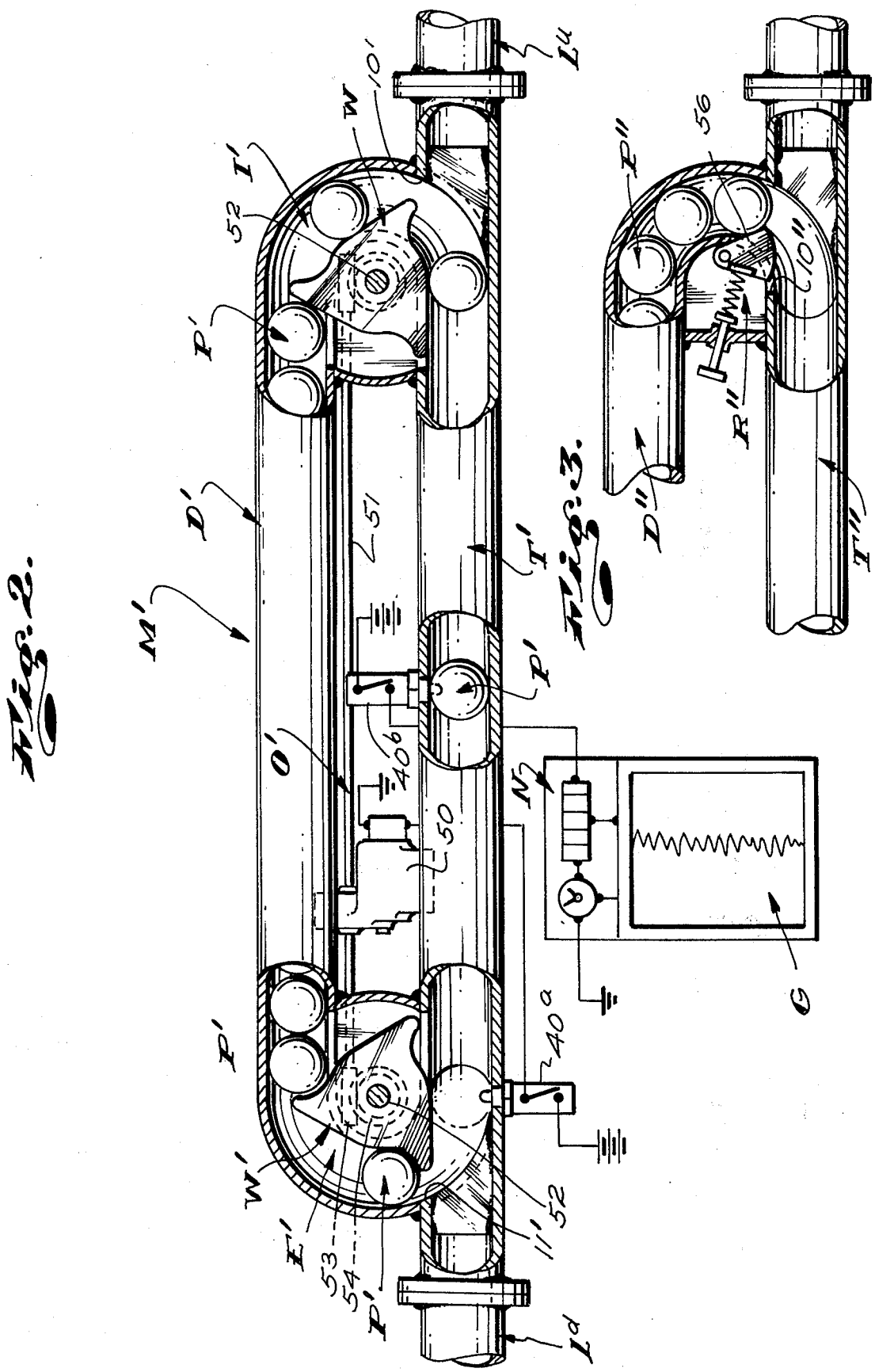

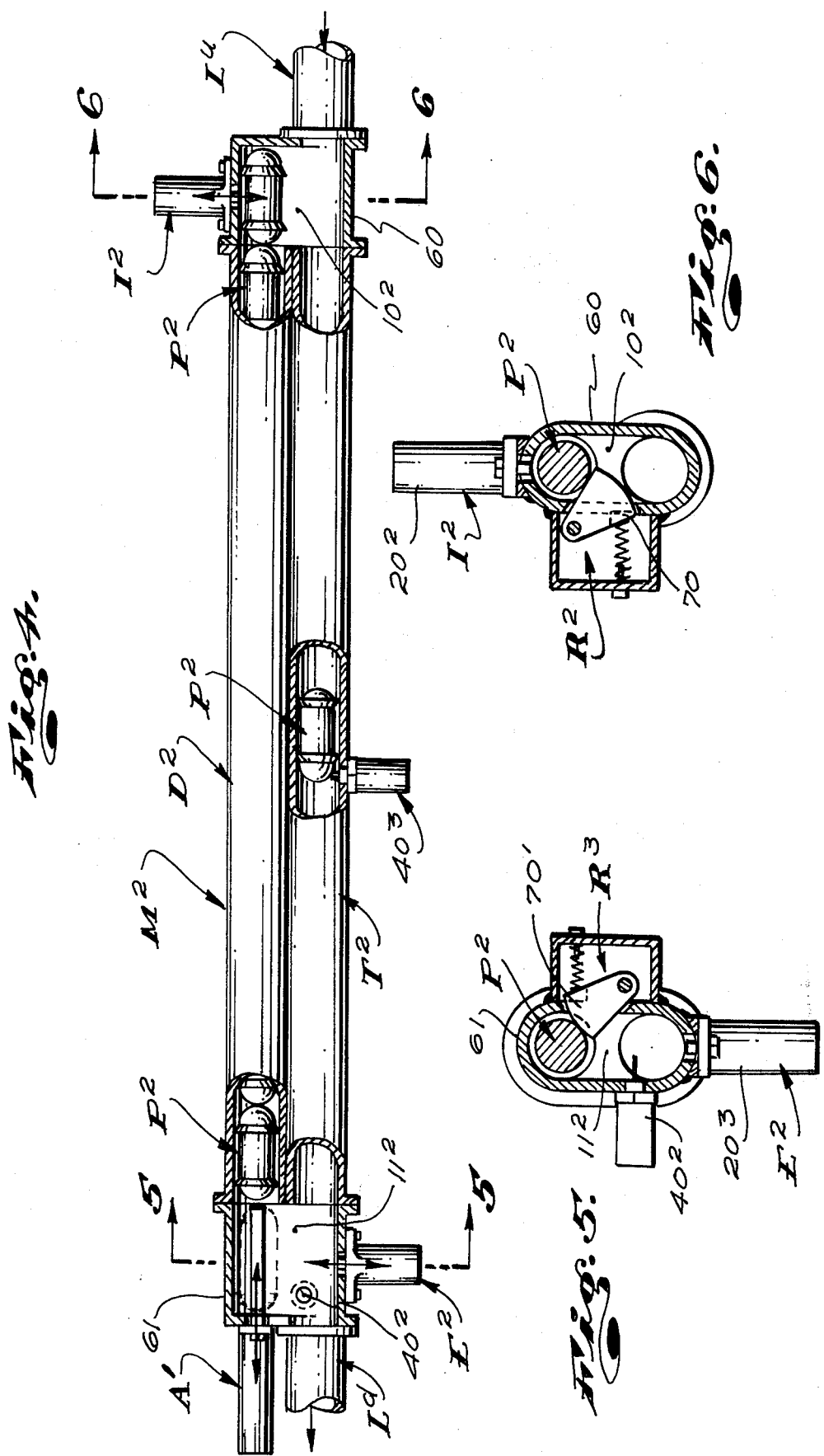

FLOW METER

This invention has to do with a flow meter and is more particularly concerned with an improved meter adapted to accurately measure the flow rate and volume of a fluid mixture of liquid and gas.

The prior art has provided practical and effective flow meters for liquids and for gas, but to the best of my knowledge and belief said art has failed to provide a simple, economical and practical meter capable of accurately and effectively indicating the volume of flowing mixtures of liquid and gas.

It is understood that failure of the prior art to provide effective metering means for liquid and gas mixtures resides in the wide differences in the physical characteristics of liquids and gases. For example, gases are inherently less dense or lighter than liquids, are more compressible than liquids and are more fluid than liquids. As a result of the above, while it is simple and practical to establish a mechanical metering means or structure to effectively measure the flow rate and volume of a liquid or of a gas, embodying substantially uniform physical characteristics, great and difficult to overcome problems or complications are presented in the establishment of fluid metering means intended to measure the flow rate and volume of fluids comprising mixtures of gas and liquid and where the distinct physical characteristics of each is present. For example, turbine or vane-type meter structures and positive displacement piston-type metering means, which are designed and intended to measure the flow rate and volume of a liquid, are incapable of properly measuring the flow rate and volume of lighter, compressible gases. Further, such metering means are such that the presence of any appreciable volume of light, compressible gas in the liquids to be measured thereby adversely affects their effectiveness and accuracy. Such adverse effects are oftentimes undetected. When such effects are detected, efforts are made to compensate for resulting errors in the meter outputs by taking samples of the fluid mixtures, determining the ratio of gas to liquid in such samples and then calculating what the average or means volumes of liquids and gases might be with respect to the meter output. Such procedures presuppose that the operation of the meters are not slowed or adversely affected by the presence of gases in the liquids or, attempts are made to determine the extent of such adverse operational effects in the meters and the findings of such attempts are sought to be incorporated in the calculations employed to determine the actual volumes of the gases and liquids being measured.

To date, the most effective means and/or procedures commonly practiced in the measurement of gas and liquid mixtures is to select a suitable liquid handling flow meter, place it in the pipe or line through which the liquid and gas mixture is conducted and to set and adjust the meter so that its read-out or output approximates the means total volume of the mixture conducted therethrough. Adjusting and setting of such meters is effected by an apparatus commonly referred to as a Meter Tester which comprises an elongate by-pass flow duct of known volumetric extent related to the line upstream of the meter to be tested and which includes means for introducing and removing plugs at its upstream and downstream ends. The plugs serve to separate predetermined volumes of the fluid mixtures in the duct and flow longitudinally therewith, through the duct. Finally, such apparatus include valve means to selectively establish flow through the by-pass duct and line. With such apparatus, it is possible to selectively by-pass plug defined test volumes of the mixture through the duct, time the movement of the volumes therethrough and calculate the rate and/or volume of flow in the line. Thereafter, the meter can be adjusted so that its read-out corresponds to the calculated flow in the line.

The obvious shortcoming in the above procedure resides in the fact that it does not and cannot take into account or compensate for variations in the relative volumes of liquids and gases that are likely to occur in the mixture or in variations in the operation of the meters that are likely to occur as a result of variations in the temperatures of the mixtures and which result in disproportionate expansion of the mixed liquids and gases.

An object and feature of my invention is to provide a novel fluid meter engageable in a fluid conducting line and which operates to effectively and accurately measure the volume of a fluid mixture of liquid and gas flowing through said line and which is substantially unaffected by the volumetric ratio of liquid and gas in said mixture.

A further object and feature of my invention is to provide a meter of the character referred to which includes an elongate flow duct of predetermined longitudinal and volumetric extent engageable between spaced upstream and downstream sections of a flow line in communication therewith, a plurality of plugs and means to intermittently and synchronously introduce and remove plugs from the upstream and downstream ends of the duct and counting means to count and record the number of plugs conducted through the duct.

Still another object of my invention is to provide a meter of the character referred to above wherein the means to introduce and remove the plugs from the duct comprises upstream and downstream plug transfer means at the upstream and downstream ends of the duct and plug transport means between said downstream and upstream transfer means.

It is an object and feature of my invention to provide a meter of the character referred to wherein the duct, transfer and transport means are in communication with each other and are sealed from outside pressures whereby a pressure balanced loop through which the plugs circulate is established.

Still further, it is an object of my invention to provide a meter of the general character referred to above which further includes drive means for the transfer means, sensing means to sense the location of plugs in the duct and adapted to control operation of the drive means and timing means related to the sensing and/or the above noted counting means whereby recorded data, comprising the number of plugs conducted through the duct and the time which lapses between the movement of the plugs from one position to another within the duct, is provided and from which both the rate and volume of fluid through the meter can be computed.

It is a general object and feature of my invention to provide a meter of the general character referred to which is simple and economical to manufacture and maintain and a meter which is accurate, dependable and durable in operation.

The foregoing and other objects and features of my invention will be fully understood and appreciated from the following detailed description and illustrations of typical preferred forms and applications of the invention throughout which description reference is made to the accompanying drawings, in which:

FIG. 2 is a view similar to FIG. 1 showing another form of my invention;

FIG. 3 is a view similar to a portion of FIG. 2 and showing a modified construction;

FIG. 4 is a view similar to FIGS. 1 and 2 showing yet another form of the invention;

FIG. 5 is a view taken as indicated by line 5—5 on FIG. 4; and

FIG. 6 is a view taken as indicated by line 6—6 on FIG. 4.

Figure 1:
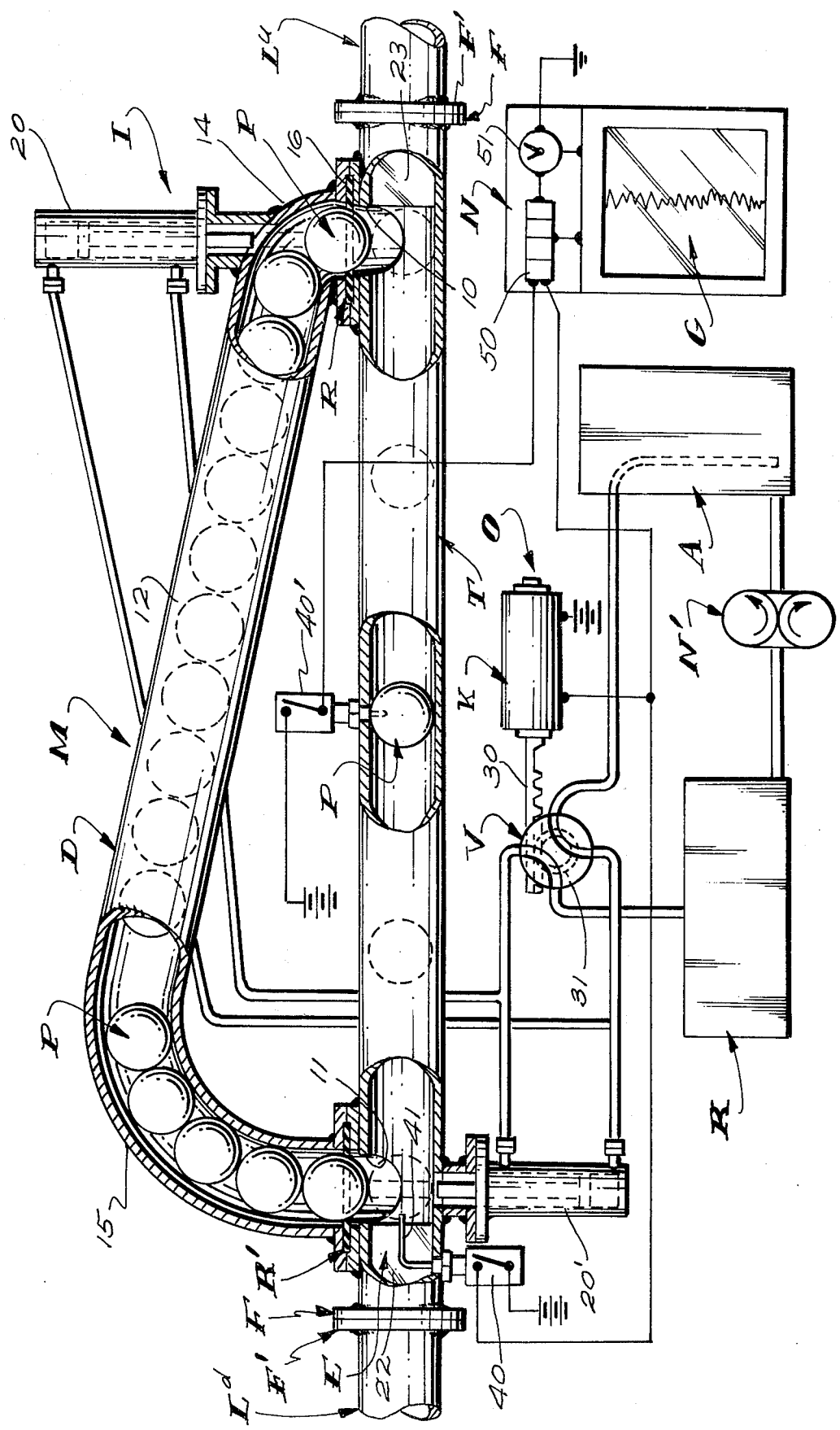
FIG. 1 is a view of my invention with portions shown in sections to better illustrate certain details of the structure.

In the form of the invention shown in FIG. 1, the meter M that I provide is a unitary structure arranged between spaced opposing ends of upstream and downstream sections of a flow line $L^u$ and $L^d$. The meter M includes, basically, an elongate flow tube T with upstream and downstream ends communicating with the sections $L^u$ and $L^d$ of the flow line, an elongate transport duct D extending longitudinally of the tube T and having an inlet end communicating with the downstream end portion of the tube T at one side thereof and an outlet end communicating with the upstream end portion of the tube T, at one side thereof. The meter M next includes a plurality of spherical plugs P corresponding substantially in diametric extent with the interior of the tube T to establish sliding sealing engagement therein, injector and ejector transfer means I and E at the upstream and downstream ends of tube and duct T and D and operating means O for the means I and E.

The tube T is a straight cylindrical length of pipe or tubing with a smooth interior wall surface and is provided with coupling flanges F at its end to facilitate connecting the meter with the opposing related ends of the sections $L^u$ and $L^d$ of the flow line, which sections are provided with complimentary flanges F'. The flange type connecting means is only intended to be illustrative of one typical form of connecting or coupling means that can be employed.

In practice, the interior of the tube can be coated with a suitable plastic or the like which presents a smooth surface and has an extremely low coefficient of friction with the plugs, that is, with the material of which the plugs P are established or coated with.

The upstream and downstream end portions of the tube T are provided with lateral openings 10 and 11 through which the plugs P can be freely moved, into and out of engagement in the tube. The openings 10 and 11 are shown as occurring in the top side of the tube.

The transfer duct is an elongate tubular part with an elongate central portion 12 spaced laterally from the central portion of the tube T, a downwardly turned upstream or outlet end 14 communicating with the opening 10 of the tube and a downwardly turned downstream or inlet end 15 communicating with the opening 11 in the tube. The duct is preferably sufficiently larger in cross-section than the diametric extent of the plugs and is such that the plugs P are freely received therein and can move freely therethrough. In practice, the duct can be of any desired cross-section and, as shown, the plugs need not seal therewith.

In practice, there is provided a number of plugs sufficient to substantially fill the duct, from one end thereof to the other, with said plugs in substantial bearing contact with each other and, in addition thereto, a limited number of extra plugs which are adapted to occur in the tube, in longitudinal spaced relationship therein and which are adapted to move downstream in the tube when the meter is in operation.

In practice, and to facilitate free operating of the means I and E, the number of plugs P in the duct is in fact one plug short or shy of completely filling the duct.

The injector means I of the transfer means includes a releasable retaining means R within the duct D adjacent its outlet end and adapted to releasably retain the plug P at the outlet end of the duct, in said duct, and clear or out of interfering engagement in the flow passage of the tube T. The means R can vary in form and construction and is shown as including an annular, flexibly and resilient, flange-like ring 16 suitably mounted in the duct and such that it normally yieldingly engages about and supports the plug in the duct which is positioned adjacent thereto. The ring 16 of the means R is such that it will yieldingly stretch and permit the passage of the plug P related thereto when the plug is forcibly urged downwardly.

The next I next includes a drive means to engage and forcibly urge the plug P related to the means R, downwardly by or through the means R and into the tube T. In practice, the drive means preferably includes a hydraulic or pneumatic double acting cylinder and ram unit 20 arranged in vertical alignment with the opening 10 in the tube, with its cylinder fixed to and projecting upwardly from the end portion 14 of the duct and with its ram projecting downwardly and shiftably vertically in and through said end portion 14 of the duct.

With the means I briefly described above and illustrated in the drawings, it will be apparent that when the unit 20 is energized, the plug P engaged by the means R is urged downwardly through the means R and into the tube T and that thereafter, when the unit 20 is operated to return its ram from a down, actuated position within the duct to normal unactuated position where it is up and clear of the duct, the next adjacent plug P in the duct is free to advance downwardly and into engagement with the means R.

The means E at the other, downstream end of the tube and duct includes a retaining means R' which can be substantially identified with the means R and a cylinder and ram unit 20' substantially identical with the unit 20 except that the unit 20' is arranged below the tube T in axial alignment with the opening 11 and is operable to urge plugs in the tube T upwardly through the means R' and into the duct D. The cylinder of the unit 20' is mounted below the tube and the ram of that unit is shiftable from a lower unactuated position where it is clear of the interior of the tube to an actuated position where it projects upwardly into the tube and toward or into the opening 11.

In addition to the foregoing, the means E includes a suitable stop and/or orienting means to stop and orient plugs advanced downstream through the tube in vertical axial alignment with the opening 11 and the unit 20'. In the case illustrated, the stop means is a simple, vertical web 22 arranged centrally of the tube immediately downstream of the opening 11 and against which the plugs stop.

A similar web 23 can be provided in the tube upstream of the opening 10 to prevent accidental movement of plugs upstream through the tube and into the flow line.

The operating means O can vary widely in form and is shown including a fluid pressure accumulator A, a reservoir K, a fluid pump N' between the accumulator and reservoir, a four-way valve V connected with and between the opposite ends of the cylinders of the units 20 and 21 with the accumulator and with the reservoir. The valve is such that when in a normal position, fluid is directed from one end of the cylinders of the units 20 and 20' to the reservoir K and fluid from the accumulator A is directed to the other ends of the cylinders of the units 20 and 20' to urge and maintain the rams thereof in their normal, unactuated position and is operable to an actuated position where the above noted direction of flow is reversed and the rams of the units 20 and 20' are urged to their actuated positions, to transfer related plugs as hereinabove described.

The means O next includes a suitable valve actuator or drive means K operable to intermittently shift or operate the valve V to and from its actuated position and control means for the means K.

The drive means K can be and is shown as including an electric linear motor or solenoid unit operable to drive a rack 30 engaging a pinion 31 on the operating shaft (not shown) of the valve. The means K is such that it rapidly drives the valve to its actuated position and remains in that position a suficient period of time to simultaneously fully actuate the units 20 and 20' of the means I and E and thereafter returns the valve to its normal position where the said units are returned to their normal position. The means E is such that the plugs are moved rapidly and synchronously into and out of the tube T and in such a manner that little or no impedence to the flow of fluid in the tube is caused.

The control means, in its simplest form, comprises a plug actuated switch 40 with a plug engaging operating arm 41 suitably arranged at and within the downstream end of the duct substantially as shown. The arm 41 is positioned within the tube so that it is engaged by the downstream most plug P in the tube T as that plug approaches aligned position with the opening 11 and so that the switch 40 is closed and the means K is actuated to effect ejection of the downstream plug from the tube and simultaneous injection of a plug into the upstream end of the tube without noticeable or appreciable delay or interruption of movement of fluid and/or plugs downstream through the duct.

In addition to the foregoing, the control means includes a counter and timer means N connected in the circuit between the switch 40 and means K which means counts and times the number of times the control means is energized to actuate the means K and units 20 and 20'.

In practice, the number of cycles or counts within a fixed period of time can be presented by a numbered read-out device 50 and the time can be presented by a clock face 51 provided in the means N. The means N can further include a suitable graphic recording means G to record cycling of the means K with respect to time and which can, if desired, be adjusted and set whereby the rate and/or volume of fluid flowing through the duct is recorded.

In practice, one or more counting switches 40', similar to the switch 40 and connected with the means N can be provided in predetermined longitudinal spaced relationship along the tube T, between the opening 10 and 11. The provision of an additional switch or switches 40', as above described, increases the number of counts effected by each plug as it moves downstream in the tube and thereby increases the accuracy of the meter read-out. Also, by dividing the column of fluid in the tube T into separated masses by a plurality of plugs, the intermediate mass or masses serve to buffer or to absorb the effect the injecting and ejecting of plugs might impose upon the flow of fluid through the tube T. By counting and timing movement of the plugs defining the central buffered masses, a smooth, uniform read-out is assured in most instances.

In practice, the spherical plugs P are preferably lightweight so that the effect of gravity therein and their mass inertia effect within the meter is maintained at a minimum. The plugs can be rigid or can be reasonably flexible, as desired, or as circumstances require.

Referring to FIG. 2 of the drawings, I have shown another form of meter M' embodying the present invention. The meter M' is similar in nature to the meter M except the injector and ejector means I' and E' include plug transporting star wheels W and W' related to the inlet and outlet openings 10' and 11' at the ends of the tube T' and duct D'.

The star wheels W and W' are adapted to be intermittently synchronously rotated a predetermining portion of one revolution by a suitable drive means E' which is part of the operating means O' of the meter. The drive means E can, as shown, include a prime mover 50 driving a shaft 51 which extends longitudinally of the meter and is drivingly connected with shafts 52 which are provided to rotatably support the wheels W and W'. The shafts can, as illustrated, be drivingly connected by means of worm and pinion gears 53 and 54.

In the case illustrated, the wheels W and W' have three arms spaced 120° from each other and are arranged so that they normally occur clear from interfering engagement in the tube T' and such that when rotated 120°, one arm advances downwardly, forwardly and thence upwardly into and out of engagement in the tube T' whereby the wheel W' engages a plug P' in the tube T' adjacent the opening 11' and transfers it through the opening 11' into the duct D' and the wheel W advances a plug P' in the duct D' adjacent the opening 10' through that opening and into the tube T', as will be abundantly clear upon viewing FIG. 2 of the drawings.

It will also be apparent that when the plugs P' are advanced from and into engagement in the tube T' in the manner noted above and as the wheels W are rotated as noted, the wheel W engages the leading plug P' at the upstream end of the duct D' and advances that plug toward the tube T' preparatory to its being advanced, further, into the tube T', upon the next cycling of the structure. Further, the wheel W' advances the plugs P' previously removed from engagement in the tube T' into engagement with their next leading plug P' in the duct D' and serves to advance the series of plugs P' in the duct D' upstream therein.

In light of the above noted operation and/or functioning of the wheel W', it will be apparent that the wheel W could be eliminated and the wheel W' utilized to advance the plugs into the upstream end of the tube as the plugs are removed from the downstream end thereof.

To the above end, and as shown in FIG. 3 of the drawings, the upstream end of the duct D'' need only be provided with a suitable releasable retaining means R'' adjacent the opening 10'' to yieldingly releasably hold the leading plug P'' in the duct D'' in said duct until it is forced thereby the advancing series of plugs in the duct. The means R'' can be similar to the means R and R' shown in FIG. 1 of the drawings or can, as shown in FIG. 3, include a simple plug-engaging spring-loaded pawl 56.

It is to be noted that in carrying out the forms of the invention shown in FIGS. 2 and 3, the portions of the wheels W and W' or the portions of the wheel W' and retainer means R'' which do not occur within the tube T' or T'' and the ducts D' or D'' are enclosed within case-like structures related to and communicating with the tubes and ducts and that the tubes and ducts are suitably formed or slotted whereby the wheels and/or pawl are free to move between and within the confines of the tubes, ducts and case-like structures.

The operating means O' in the form of the invention shown in FIG. 2 of the drawings and which would be provided in that form of the invention if further modified in accordance with the showing in FIG. 3 of the drawings is or can be essentially the same in principle as that provided in FIG. 1 of the drawings, and can include a plug-actuated cycling switch $40^a$ at the downstream end of the tube T' to control the prime mover, a plug actuated counter switch $40^b$ between the ends of the tube, counter and timer means N' related to the switches and which can include a recording means G'.

In the form of the invention shown in FIGS. 4, 5 and 6 of the drawings, I have shown a more compact form of meter $M^2$ wherein the tube and duct are in side by side relationship and wherein elongated plugs $P^2$ can be advantageously employed.

In this form of the invention, the openings $10^2$ and $11^2$ are elongated to accommodate the elongated plugs $P^2$ and can, as shown, be established by extremely simple chest-like units 60 and 61 which are connected with and between related ends of the tube $T^2$ and $D^2$ and with the sections $L^u$ and $L^d$ of the flow line and which define transfer chambers between the said related ends of the tube and duct, the central portions of which chambers constitute or define the openings $10^2$ and $11^2$.

The meter $M^2$ includes means $I^2$ and $E^2$ similar to the means I and E in the first form of the invention and which include linear prime movers $20^2$ and $20^3$ in the form of hydraulic or pneumatic cylinder and ram units or electric solenoids. The means $20^2$ is operable to shift and move plugs $P^2$ delivered to the upstream end of the duct $D^2$ into the upstream end of the tube $T^2$ and the means $20^3$ is operable to shift and move plugs $P^2$ delivered to the downstream end of the tube $T^2$ out of engagement in the tube and into the duct $D^2$ or into the chamber defined by the chest 60 preparatory to its being moved into the duct $D^2$.

The meter $M^2$, like the meter M, is provided with retaining means $R^2$ and $R^3$ to releasably hold the plugs at the ends of the meter in proper operating position during cycling of the construction.

The means R2 is shown as including a spring-loaded pawl 70 at one side of the duct 61 and operable to yieldingly releasably hold the plug $P^2$ at the upstream end of the construction next to be introduced into the tube $T^2$ out of and clear of interfering engagement in the tube. The means $R^3$ includes a similar pawl 70' related to the chest 61 and adapted to hold plugs $P^2$ move out of engagement in the tube $T^2$ in alignment with the duct $D^2$.

In addition, the meter $M^2$ includes advancing means $A^1$ adapted to be operated following each synchronous operation or action of the means $I^2$ and $E^2$, to advance the plug $P^2$ last moved from engagement from the tube $T^2$ by the means $E^2$ upstream and into engagement in the duct $D^2$, advance the series of plugs in the duct $D^2$ upstream and advance the plug which is the next to be injected plug, into position and aligned with the means $I^2$. The means A' is a simple cylinder and ram unit or linear electric prime mover mounted at the downstream end of the chest 61 in axial alignment with the duct $D^2$ and so that its linearly shiftable member is shifted in an upstream direction into and through the chest 61, when the means A' is actuated, to engage and shift a plug moved in the chest, into alignment with the duct $D^2$, upstream into said duct and to thereby move or advance the plugs $P^2$ in said duct, upstream, as required.

The control means and/or operating means (not shown) can be essentially the same as the control and/or operating means in the previously considered forms of the invention and preferably includes a plug actuated cycling switch $40^2$ at the chest 61 and can, if desired, include a plug-actuated counter switch $40^3$ between the ends of the tube $T^2$.

The plugs $P^2$ are shown as including elongate cylindrical bodies, longitudinally spaced, annular, radially outwardly projecting, flexible, fluid pressure actuated, tube engaging sealing flanges at the opposite ends of the bodies. In practice, the ends of the plug bodies can be provided with semi-spherical or otherwise suitably shaped ends.

The plugs are preferably hollow structures, in the nature of canisters and such that they are normally lighter than the fluid they displace and so that they can be advantageously filled with suitable ballast whereby their mass is equal or substantially equal to the mass of fluid they displace and such that their mass affords minimum effect on the flow of fluid through the tube $T^2$.

It will be apparent that the fourth and last considered form of my invention is such that, by suitable reproportioning of the chests 60 and 61, spherical plugs can be advantageously employed, if such is desired.

Having described typical preferred forms and applications of my invention, I do not wish to be limited to the specific details herein set forth but wish to reserve to myself any modifications or variations which may appear to those skilled in the art and which fall within the scope of the following claims.

Having described my invention, I claim:

1. An elongate fluid flow meter with upstream and downstream ends, comprising an elongate flow tube with upstream and downstream ends substantially co-extensive with the meter means, means connecting the upstream and downstream ends of the tube with upstream and downstream sections of a fluid line, an elongate transport duct at the exterior of the tube with upstream and downstream ends communicating with sides of the tube adjacent the upstream and downstream ends thereof; a plurality of plugs shiftable longitudinally in and through the duct and tube, intermittently operable plug engaging transfer means actuatable to synchronously transfer a plug transported through the duct to the end thereof into the tube and to transfer a plug transported through the tube to the downstream end thereof into the duct, control means for the transfer means comprising a plug sensing device at a predetermined position longitudinally of the tube, connected with the transfer means and operable to sense the presence of a plug in the tube at said position and cause the transfer means to actuate whereby plugs are transferred into and out of the upstream and downstream ends of the tube without substantially impeding of the flow of fluid through the tube and means to count and time intervals between plugs sensed by the device.

2. A meter as set forth in claim 1 wherein said transfer means includes an elongate shiftable plug-engaging member at the downstream end of the tube on an axis substantially normal to the axis of the tube and at that side of the tube opposite from the downstream end of the duct, said member normally occurring outward of the tube and shiftable transversely therethrough to engage a plug in the tube adjacent thereto and move it laterally into the duct when the transfer means is actuated.

3. A meter as set forth in claim 2 wherein said transfer means includes retaining means at the upstream end of the meter releasably retaining the upstream most plug in the duct laterally outward of the tube, said duct accommodating a series of plugs in substantial bearing contact whereby said upstream most plug is displaced from the duct urged by the retaining means when a plug is transferred from the tube into the duct at the downstream end of the meter.

4. A meter as set forth in claim 2 including retaining means at the downstream end of the duct and engageable with the downstream-most plug in the duct to prevent downstream movement of that plug in the duct.

5. A meter as set forth in claim 2 wherein said transfer means includes retaining means at the upstream end of the meter releasably retaining the upstream-most plug in the duct laterally outward of the tube, said duct accommodating a series of plugs in substantial bearing contact whereby said upstream-most plug is displaced from the duct and urged by the retaining means when a plug is transferred from the tube into the duct at the downstream end of the meter, and retaining means at the downstream end of the duct and engageable with the downstream-most plug in the duct to prevent downstream movement of that plug in the duct.

6. A meter as set forth in claim 1 wherein said transfer means includes an elongate axially shiftable plug-engaging member at the downstream end of the tube on an axis substantially normal to the axis of the tube and at that side of the tube opposite from the downstream end of the duct, said member normally occurring outward of the tube and shiftable transversely therethrough to engage a plug in the tube adjacent thereto and move it laterally into the duct, a second elongate axially shiftable plug-engaging member at the upstream end of the duct on an axis substantially normal to the axis of the tube and shiftable transversely into and through the duct to engage the upstream-most plug in the duct and move it laterally into the tube when the transfer means is actuated.

7. A meter as set forth in claim 6 wherein said transfer means further includes a third elongate axially shiftable plug-engaging part at the downstream end of the duct in axial alignment therewith and shiftable from a normal position downstream from the duct axially upstream into the duct to engage a plug transferred from the tube into the duct and advance that plug and adjacent plugs upstream in the duct.

8. A meter as set forth in claim 7 including retaining means at the upstream and downstream ends of the meter engaging the upstream-most and downstream-most plugs in the duct and releasably retaining said plugs laterally outwardly from said tube.

9. A meter as set forth in claim 1 wherein the transfer means includes a plug-engaging arm supported on an axis at the downstream end portion of the meter upstream of the downstream end of and between the tube and the duct and selectively shiftable from a normal position spaced from the interior of the tube, laterally inwardly, downstream and thence laterally outwardly into and through the tube and thence laterally inwardly and upstream in the duct to engage a plug in the downstream portion of the tube and transfer it into the downstream portion of the duct and drive means to move said arm from and to its normal position.

10. A meter as set forth in claim 1 wherein said transfer means includes retaining means at the upstream end of the meter releasably retaining the upstream-most plug in the duct laterally outward of the tube, said duct accommodating a series of plugs in substantial bearing contact whereby said upstream-most plug is displaced from the duct urged by the retaining means when a plug is transferred from the tube into the duct at the downstream end of the meter.

11. A meter as set forth in claim 9 wherein said transfer means includes a second plug-engaging arm supported on an axis at the upstream end of the meter downstream of the upstream end of and between the tube and duct and selectively shiftable from a normal position in the duct downstream of the upstream-most plug in the duct, and selectively shiftable out of the duct laterally toward said tube whereby said upstream-most plug is moved into the tube and thence shiftable laterally outwardly relative to the tube and laterally inwardly into the duct to its normal position downstream of the next upstream-most plug in the duct and drive means for the second arm.

12. A meter as set forth in claim 1 wherein said transfer means includes a star wheel rotatably supported between the duct and tube upstream of the downstream ends thereof on an axis normal to the common plane of the tube and duct and having radially extending plug-engaging arms moveable laterally into, downstream and thence laterally outward of the tube and thence laterally into the upstream in and thence laterally out of the duct, one of said arms engaging a plug in the downstream end of the tube and moving it ito the downstream end of the duct each time the transfer is actuated and drive means operable to rotate the wheel a portion of predetermined one revolution each time the transfer means is actuated.

13. A meter as set forth in claim 12 wherein said transfer means includes a second star wheel rotatably supported between the duct and tube downstream of the upstream ends thereof on an axis normal to the common plane of the tube and duct and having radially extending plug-engaging arms moveably laterally into, upstream in and thence laterally outward of the duct and thence laterally into and downstream in and thence laterally out of the duct, one of said arms engaging the upstream-most plug in the duct and the downstream side thereof and moving it into the upstream end of the tube each time the transfer means is actuated and drive means operable to rotate the second wheel a predetermined portion of one revolution each time the transfer means is actuated.

* * * * *